June 8, 1948.
C. M. TUTTLE
2,443,171
PHOTOGRAPHIC FILM GATE FOR PROJECTORS
Filed Sept. 14, 1945
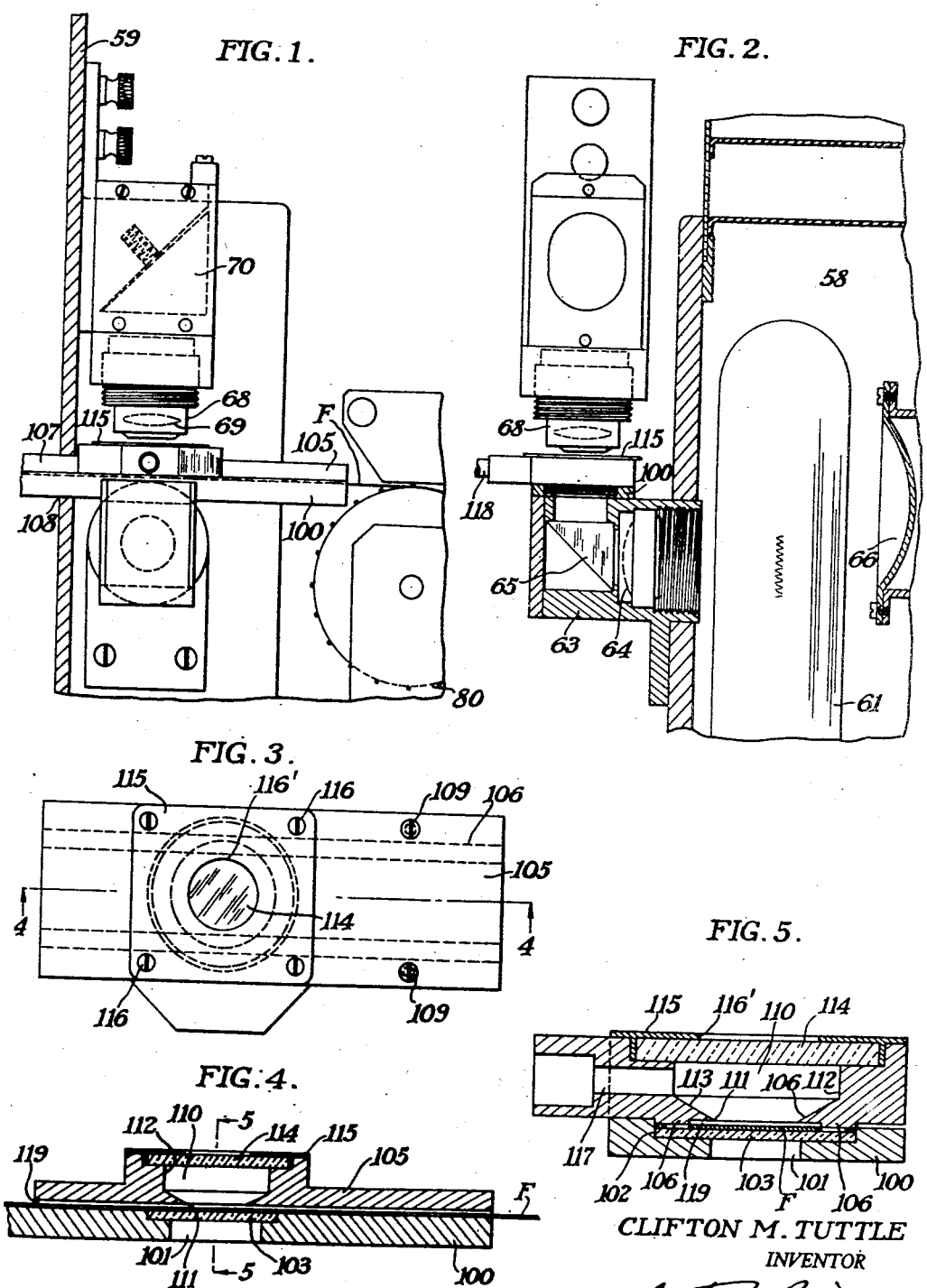
CLIFTON M. TUTTLE
INVENTOR
BY 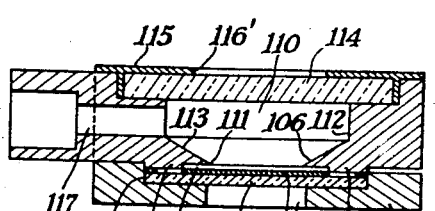
ATTORNEYS Patented June 8, 1948

2,443,171

UNITED STATES PATENT OFFICE 2,443,171

PHOTOGRAPHIC FILM GATE FOR PROJECTORS

Clifton M. Tuttle, Rochester, N. Y., assignor to Eastman Kodak Company, Rochester, N. Y., a corporation of New Jersey Application September 14, 1945, Serial No. 616,296

5 Claims. (Cl. 88—24)

1

The present invention relates to photographic film gates for projection apparatus, and particularly to a gate designed to hold a film flat in the film plane of the projector and cool the frame that is in projecting position.

In all projection apparatus it is desirable to position a film as accurately as possible in a film plane at the focal point of a projection lens in order to obtain the best definition possible. With projection apparatus using long focal length projection lenses this problem is not too critical because such a lens system has a depth of focus which will tolerate a certain amount of curvature of the plane. However, with projection apparatus using short focal length projection lens systems the problem of holding the film flat in the gate becomes more and more critical in order to obtain a desired definition over the entire projected frame of film.

Furthermore, in projection apparatus using a bright light source and in which the film is still in the gate for a comparatively long period (5 to 15 seconds) it is necessary to efficiently cool the frame of film in the gate to prevent it from being damaged by the heat and/or from catching fire. It is known that prior art shows projectors having gates in which the film is cooled by air streams directed against the films to protect them from the heat of a projector beam, but the prior art arrangements are solely for cooling purposes, having nothing to do with holding the film flat at the gate, and are necessarily unduly noisy because of the manner in which the air streams are directed into the gate.

The present invention relates to a photographic film gate which is adapted for use on the photographic recorder disclosed in pending U. S. patent application Serial No. 600,250, filed June 19, 1945, and which is a decided improvement in the film gate shown in said application.

One object of the present invention is the provision of a photographic film gate which holds the entire frame of film flat within a few wave lengths of light.

Another object is to provide a film gate in which air pressure is used to hold the film flat and at the same time efficiently cool the same.

And a further object is to provide a film gate of the type described which is silent in operation despite the use of air under pressure to hold the film flat and to cool it.

And another object is to provide a film gate which is simple and rugged in construction, despite the fact that it is most efficient in operation,

2 and contains no movable parts which can wear out.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which Fig. 1 is a side elevation of a projection apparatus incorporating a film gate constructed in accordance with a preferred embodiment of the present invention, Fig. 2 is an end elevation, partly in section, of the projection apparatus shown in Fig. 1, Fig. 3 is an enlarged top plan view of the film gate per se, Fig. 4 is a longitudinal sectional view taken substantially on line 4—4 of Fig. 3, and Fig. 5 is a transverse sectional view taken substantially on line 5—5 of Fig. 4.

Like reference characters refer to corresponding parts throughout the drawings.

Briefly, the present film gate comprises two apertured gate members which when brought into face to face relation form a channel through which the film strip is moved longitudinally. The base of the film guiding channel, or at least that portion including the aperture, is a transparent plate which defines the film plane and against which the film strip is held flat by air pressure. The other side of the channel, and particularly that part including the aperture in the other gate member, is slightly spaced from the film where the latter is forced against the transparent plate by air issuing from the aperture to constitute an exhaust conduit for said air which runs lengthwise of said gate member from said aperture and causes the exhausting air to flatten the full width of the film in the gate with a sweeping action. The aperture in the upper gate member is enlarged to form an air chamber which is closed by a window. Air under pressure is introduced into this chamber in a direction away from the open end thereof so that a uniform pressure is built up therein and the air issues over the entire open end with substantially equal force to give the desired flattening action to the film in the gate.

For purposes of disclosure I have shown my novel gate in conjunction with a projection apparatus of the type disclosed in the above noted copending application for it was for this use that it was designed. However, it will be readily appreciated that it could be used in any type of projection apparatus with little or no modification.

Referring now to the drawings, and particularly to Figs. 1 and 2, the complete projection apparatus includes a lamphouse 58 mounted on a supporting wall 59 so that it is to one side of the film path. In this lamphouse there is positioned a lamp 61 whose filament is located below the plane of the film path. Fixed in the vertical wall of the lamphouse at a point below the film path, and in alignment with the lamp filament, there is a mount 63 containing a suitable condenser system 64 and a right angle prism 65, which in combination with a reflector 66 in the lamphouse form an optical system for uniformly illuminating the aperture of the film gate. A second optical mount 68 is fixed to the supporting wall 59 above the film gate, and this mount includes a suitable projection lens system 69, and a deviating prism 70 which in turn form an enlarged image of the film frame in the gate and project it forwardly onto a suitable viewing screen, not shown.

Inasmuch as a relatively bright source of illumination is needed to project an image of the magnification desired, 360 times, along with the fact that the exposed area of film remains in the projecting position for a comparatively long time, means must be provided for supporting the film at the gate to prevent it from catching fire or otherwise being damaged by the intense heat. Furthermore, and more important, since this desired magnification must be obtained with a limited projector to screen distance, it is necessary to use a comparatively short focal length projection lens system. This makes it imperative that the entire frame of film in the gate remain flat very accurately in the film plane so that definition of the entire projected image will be satisfactory. To these ends, the novel film gate constituting the present invention has been designed.

Referring now to the drawings, and particularly to Figs. 3, 4, and 5, the novel film gate constituting the present invention will be described. The film gate includes a first or bottom elongated gate member 100 which is fixed to the mount 63 in any suitable manner, not shown, so as to guide the film across the light beam of the projector. This gate member includes a projection aperture 101 which is in optical alignment with the condenser system of the projector. It is also provided with a channel or groove 102 running the full length thereof, see Figs. 4 and 5, which is substantially the same width as the film strip F moving therethrough so that it guides the same in longitudinal movement. The bottom of the groove or channel 102 is recessed about the aperture 101 to provide a seat for a transparent plate 103. The top surface of this plate preferably is flush with the bottom of the channel and its top surface should be substantially optically flat because it constitutes the film plane of the projection system. It will be noticed that the top of the plate is located below the top of the gate member by an amount substantially the same as the thickness of the film so that the film is guided edgewise by the channel 102 and its top surface is flush with, or preferably slightly below, the top surface of the gate member. It is pointed out that instead of having the transparent plate 103 seated in a recess in the groove of the channel of the gate member, as shown, the entire bottom of the channel could be a transparent plate if desired. This would eliminate the precision necessary in forming the depth and the thickness of the plate to obtain a bottom in the channel lying in a single plane.

The film strip is held in the channel of the bottom gate member 100 by a top elongated gate member 105 of the form best shown in Figs. 3–5. This gate member rests on the top of the first gate member and, when perforated film is used, preferably includes two film guides 106 at either edge which extend into the channel 102 in the bottom gate member and engage the margins of the film to hold the same in the channel. The film guides 106 are just wide enough to cover the perforations in the edges of the film strip for the reasons hereinafter fully set forth. This top gate member is held in place on the bottom gate member by having one end 107 thereof extending through an aperture 108 in the supporting wall 59 while the other end thereof is held to the bottom gate member by screws 109. It is pointed out that the top gate member merely acts to confine the film strip to the channel 102 in the bottom gate member and should not be drawn down sufficiently tight to hamper the film strip from being fed through the gate by any suitable means, such as sprocket 80 which is turned intermittently by any suitable mechanism, not shown.

That portion of the top gate member 105 above the aperture 101 in the bottom gate member 100 is thicker than the remainder of the gate member and includes an aperture 110 in optical alignment with the aperture 101. The inner end 111 of this aperture is substantially the same size as, or slightly smaller than, the aperture 101 in the gate member and is substantially the same size as the frame of film in projecting position. That portion of the aperture 110 intermediate the two faces of the thick portion of the gate member 105 is enlarged as shown at 112 to form an air chamber which communicates with the inner end 111 of the aperture by a conical wall 113. The outer end of the aperture 110 is covered with a window 114 which is held in a recess in the top of the gate member by a metal cap 115 having an opening 116 therein in optical alignment with the apertures 101 and 110 in the gate members to permit the projected image of film to pass to the projection lens. This cap is fastened to the top gate member 105 by screws 116 and a circular flange thereon closely fits between the edge of the window 114 and the wall of the seat therefor to provide a fluid tight connection.

The wall of the thick portion of the gate member 105 is provided with an inlet port 117 to which an air line 118 connected to a source of air under pressure, such as an air compressor, not shown, may be connected to introduce air into the inner chamber. It will be noted that this port is directed into the air chamber at right angles to the axis thereof, or away from the film, so that it is not the direct stream of air therefrom that is relied upon to hold the film flat in the gate. Instead, the construction of the chamber and the manner of bringing the air thereinto is such that a substantially uniform pressure is built up in the chamber and a blast of air substantially the size of the inner end 111 of the aperture 110 strikes the entire frame of film at right angles thereto, and serves to press the film against the transparent plate 103. It has been found that by this arrangement the entire frame of film at the gate is actually held flat within a few wave lengths of light as evidenced by the appearance of interference rings in the projected image.

To provide an exhaust for the air and to make this exhaust serve a useful purpose, that portion of the top gate member 105 between the film guides 106 is cut away the full length of the gate member to provide an exhaust conduit 119 between the top gate member and the film surface. Thus, air issuing from the air chamber must pass through this restricted exhaust conduit 119 and the full length of the gate member to exhaust to the atmosphere. This causes the air to sweep the film in such a way as to efficiently cool it and in addition act to flatten it in the guiding channel. Making the film guides 106 on the top gate member wide enough to cover the perforations in the margins of the film strip prevents the exhausting air from entering the film perforations and tending to get behind and raise the film from the plate 103. It will be understood that if unperforated film were used that this difficulty would not present itself and the film guides could be eliminated. In this case the under side of the edges of the top gate member could confine the margins of the film to the channel in the lower gate member, it being assumed that the channel would be substantially the same depth as the thickness of the film.

Another remarkable and desirable feature of this film gate is that despite the use of an air blast to hold the film flat in the gate and to cool it in situ there is comparatively no noise. This is important in any projection apparatus, but it is particularly important in projection equipment which is not enclosed in a projection booth and which is used in the environment of sound recording equipment in connection with the projector or entirely separate therefrom. It will be appreciated that this gate makes possible the use of an air blast for film flattening and cooling in a restricted space; or, stating it another way, in projecting systems using short focal length projection lenses and wherein only a limited space is available between the gate and the projection lens.

Although I have shown and described one specific embodiment of my invention I am fully aware that many modifications thereof are possible. My invention, therefore, is not to be limited to the precise details and construction shown and described, but is intended to cover all modifications coming within the scope of the appended claims.

Having thus described my invention, what I claim as new and desire to secure by Letters Patent of the United States is:

1. A photographic film gate comprising a pair of elongated apertured gate members in face to face relation; a first gate member provided with a longitudinal groove substantially the width of the film strip to receive and guide the strip longitudinally; a transparent plate in the bottom of said groove in covering relation with said aperture and constituting the film plane; a pair of spaced film guides on said second gate member adapted to extend into said groove in the first gate member and engage the longitudinal margins of a film strip therein and confine the film to longitudinal movement therein; that portion of the face of the second gate member between said film guide and including said aperture recessed to be slightly spaced from the adjacent surface of the film strip and provide an exhaust conduit leading from the aperture in said second gate member along the gate member to a point remote from said aperture; a window covering the end of the aperture remote from said recessed portion of the gate member; and means for building up a pressure of air in said aperture in said second gate member which will pass therefrom into said recessed portion of the second gate member and pass through said exhaust conduit to the atmosphere to sweep the film flat against said transparent plate and cool it at the same time.

2. A photographic film gate according to claim 1 in which said last mentioned means includes a port in the wall of said aperture of said second gate member directed away from the open end thereof and which may be connected to a source of air under pressure.

3. A photographic film gate according to claim 1 in which that portion of the aperture in said second gate member spaced from said recessed portion is enlarged in volume to provide an air chamber; an inlet port extending into the side wall of said chamber which is adapted to be connected to a source of air under pressure.

4. A photographic film gate for accommodating film having perforated margins comprising an elongated bottom member provided with a groove extending lengthwise thereof through which a strip of film is adapted to be fed longitudinally, said groove being substantially the same width as the film and slightly deeper than the thickness of the film, the grooved wall of said bottom member provided with a projection aperture, a glass plate in said groove in covering relation with said aperture and defining the film plane, an elongated top member lying face-to-face with the top surface of said bottom member and forming with said groove a channel through which the film passes and which channel is slightly deeper than the thickness of the film and is open only at the ends of the members remote from said projection aperture, a pair of laterally spaced elongated film guides extending downwardly from the lower face of said top member into the edges of the groove in the bottom member to engage the margins of a film situated in said groove and being of such width as to cover the perforations in the film strip, said top member provided with a bore constituting a projection aperture in alignment with the projection aperture in said bottom plate, said bore including an enlarged portion spaced from said film and providing an air chamber terminating in an exit adjacent the film and which exit is smaller in diameter than said air chamber and is substantially the size of the exposed frames of the film, a transparent plate closing the upper end of said bore, and an air inlet in the side wall of said bore directed away from the film surface and into which air, under pressure, may be introduced into said chamber, whereby said air, in exhausting from said chamber, leaves said exit at right angles to the film surface to force the film flat against the glass plate, and then sweeps through the space formed between the upper film surface and the top member to the open ends of the members to effectively cool and flatten the film in the groove of the bottom gate member.

5. A photographic film gate comprising a top and bottom elongated plate in face-to-face relation and each plate provided with an aperture disposed intermediate the ends of the plate and in alignment with each other, the upper face of said bottom plate provided with a groove substantially the same width as the film and deeper than the thickness of the film whereby when a film is located therein there exists a restricted exhaust conduit between the upper face of the film and the lower face of the top plate from both sides of the aperture in said top plate to the ends of the plates, a glass window in the aperture in said bottom plate whose upper flat surface is flush with the bottom of said groove and forms the film plane at the projection aperture, a glass plate covering the upper end of the aperture in the top plate in a fluid-tight manner, and means for directing air, under pressure, into said aperture in the top plate in a direction other than towards said film to build up an air pressure in said aperture, whereby said air in exhausting therefrom strikes the film at right angles to the top face thereof to hold the film flat in said film plane and must exhaust through said exhaust conduits and sweep the film flat against the bottom of said groove and effect a cooling thereof.

CLIFTON M. TUTTLE.

REFERENCES CITED

The following references are of record in the file of this patent:

UNITED STATES PATENTS

| Number | Name | Date |
| --- | --- | --- |
| 1,082,678 | Casler | Dec. 30, 1913 |
| 1,427,575 | Brenkert et al. | Aug. 29, 1922 |
| 1,770,659 | Oehmichen | July 15, 1930 |
| 2,029,871 | Johnson | Feb. 4, 1936 |
| 2,199,305 | Dewey | Apr. 30, 1940 |
| 2,315,914 | Wengel | Apr. 6, 1943 |

FOREIGN PATENTS

| Number | Country | Date |
| --- | --- | --- |
| 297,130 | Great Britain | Sept. 14, 1928 |
| 331,743 | Great Britain | July 10, 1930 |